Nov. 13, 1956     E. N. WILLINGHAM     2,770,468

VEHICLE SWAY STABILIZER

Filed Jan. 25, 1954

INVENTOR.
Elijah N. Willingham
BY

Att'y

United States Patent Office 2,770,468
Patented Nov. 13, 1956

2,770,468
VEHICLE SWAY STABILIZER
Elijah N. Willingham, Bayside, Calif.

Application January 25, 1954, Serial No. 405,992

2 Claims. (Cl. 280—112)

This invention relates to improvements in sway stabilizers and has particular reference to a positive mechanical means for causing the body of a motor vehicle or the like to be stabilized, particularly in the preventing of side sway caused by the inertia of the vehicle, as in going around a curve.

A further object is to produce a device of this character which may be used on any form of vehicle and one which will automatically react, thus eliminating any need of the operator endeavoring to overcome the side sway.

A further object is to produce a device of this character which may be attached to any form of motor vehicle without materially altering its construction.

A further object is to produce a device of this character which is economical to manufacture and one which is sturdy in construction.

Other objects and advantages will be apparent during the course of the following description.

Figure 1:
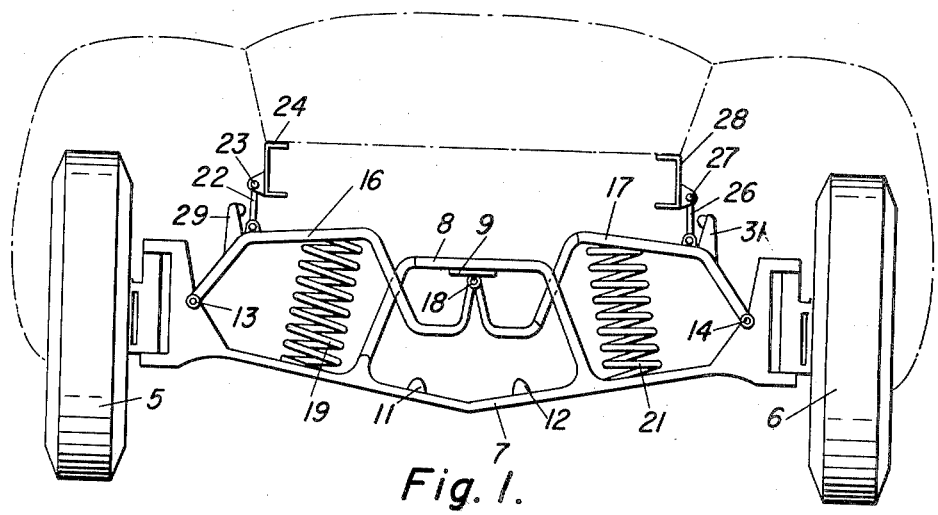
Figure 2:
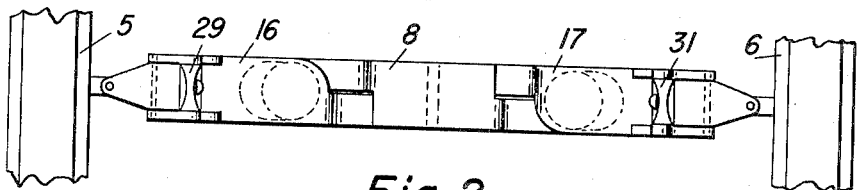
Figure 3:
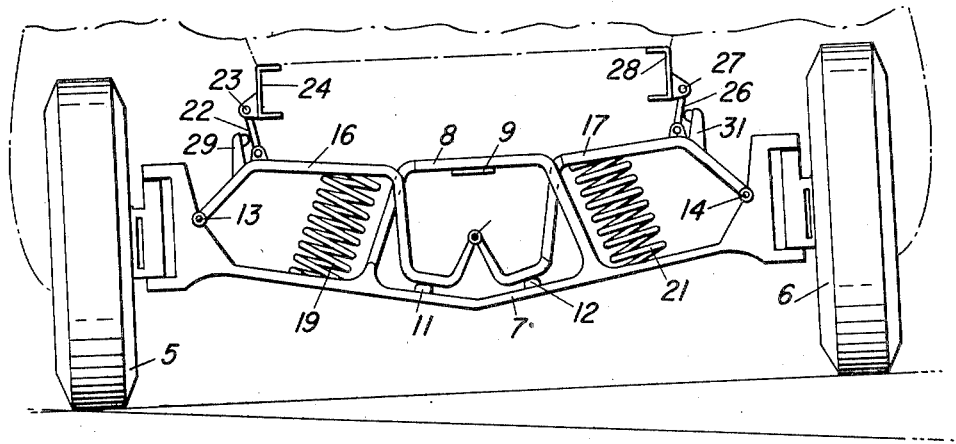

In the accompanying drawings forming a part of this specification and in which like numbers are employed to designate like parts throughout the same, Fig. 1 is a front elevation of a motor vehicle axle having my invention applied thereto; and Fig. 2 is a top plan view of Fig. 1; and Fig. 3 is a view similar to Fig. 1 showing the parts in depressed position.

Vehicles which travel over various surfaces such as highways and which comprise automobiles, trucks, trailers, railroad cars and the like, having a tendency to tip in going around a corner, due to the inertia of the body tending to cause it to follow a tangential course. This results in a side sway of the body as it presses downwardly on the wheels toward the outer side of the curve and tending to raise the wheels on the inside of the curve. This has a dangerous effect in that it causes skids, tipping, and in some instances may cause the entire vehicle to tip over with serious consequences.

It is therefore advantageous that the load remain evenly distributed over the wheels on both sides of the vehicle. This I have accomplished by providing a structure which transfers the pressure equally to both sides when the vehicle is in motion. For instance, if the body of the vehicle tends to tip toward the left, this tipping effect will in turn pull the right side of the body downwardly so as to maintain the body parallel with the axis and with an equal distribution of weight over the wheels on both sides of the vehicle.

In the accompanying drawings, wherein for the purpose of illustration is shown a preferred embodiment of my invention, the numerals 5 and 6 designate the wheels on the opposite sides of the vehicle, and the numeral 7 the axle of the vehicle. The axle here shown as a front axle may also represent the rear axle. This axle has a raised bridge portion 8 which has a contact pad 9. Contact pads 11 and 12 are mounted on the axle 7. Pivoted as at 13 and 14 are braces 16 and 17 respectively, the ends of which braces are pivoted as at 18, which pivot is so arranged as to underly and engage the pad 9 formed on the raised bridge portion 8.

Springs 19 and 21 extend between the axle 7 and the braces 16 and 17 respectively.

Pivoted to the top of the brace 16 is a link 22 which is in turn pivoted as at 23 to one of the frame members 24 of the vehicle chassis. A link 26 pivoted to the brace 17 is also pivoted as at 27 to the opposite frame member 28.

I have shown in dotted lines the manner in which the body of the vehicle will be attached to the frame members 24 and 28. At 29 and 31 I have shown upstanding lugs, each of which has a rubber pad engaging the links 22 and 26 respectively, which permits a slight movement of the frame from side to side and also tends to absorb road shock.

The result of this construction is that as long as the vehicle is moving over a level and straight-away surface, the downward pressure on the two bearings and to the axle will be equal on both sides of the vehicle, and therefore the load on the wheels of both sides will be substantially the same.

Assuming now that the vehicle is moving around a left-hand turn at a speed great enough to set up a lateral inertia stress, this stress will be in the opposite direction from the turn, or toward the right, and if the speed is sufficient, a stress may be set up capable of turning the vehicle completely over on its side. With my structure this tendency of the body of the vehicle to tip toward the right in such an example will have the following effect: It will cause a downward pressure on the right side of the frame, which pressure will be in turn transferred from the frame through the link 26 to the brace 17 and consequently will move it downwardly against the action of the spring 21. As this brace 17 is pivoted as at 18 to the brace 16, it will move the pivot point 18 downwardly, carrying the brace 16 downwardly and exerting a pull on the frame 24, thus causing the load to be equally re-distributed to the wheel 5 which would otherwise have had a tendency to raise from the road by the upward lift of the tipping vehicle body.

Thus by keeping the load evenly distributed over the wheels on both sides of the vehicle, this tendency to tip has been eliminated. Also, the tendency to skid will be minimized to a very great extent.

It is of course understood that the same principle could be adapted as a base for stationary machinery, appliances, beds, etc., and that when used as a motor mount, it would counteract the torque thereof and would also function to maintain the axle and body substantially level should one of the springs of the vehicle be broken.

It is also to be understood that the form of my invention herewith shown and described is to be taken as a preferred example of the same and that various changes relative to the material, size, shape and arrangement of the parts may be resorted to without departing from the spirit of the invention or the scope of the subjoined claims.

Having thus described my invention, I claim:

1. A sway stabilizer comprising a load-carrying axle, a pair of braces hinged one to the other and having their opposite ends hinged at points adjacent the extremities of the axle, independent spring means extending between said axle and each of said braces, and pivotal connections connecting the opposite sides of the load to one of the respective adjacent braces.

2. A sway stabilizer comprising a load-bearing axle, said axle having a raised bridge portion, a pair of braces, each having one end thereof pivoted to said axle and having their opposite ends pivoted one to the other at a point beneath said bridge portion, spring means interposed between said axle and each of said braces, and pivoted links connecting each of said braces and the adjacent body load.

References Cited in the file of this patent

UNITED STATES PATENTS

| 1,127,608 | Ferguson | Feb. 9, 1915 |
| 1,212,987 | Morrow | Jan. 16, 1917 |
| 2,142,613 | Mapes | Jan. 3, 1939 |